May 1, 1962 — C. HEUCKEROTH — 3,031,947
PERCOLATOR
Filed March 23, 1959 — 4 Sheets-Sheet 1
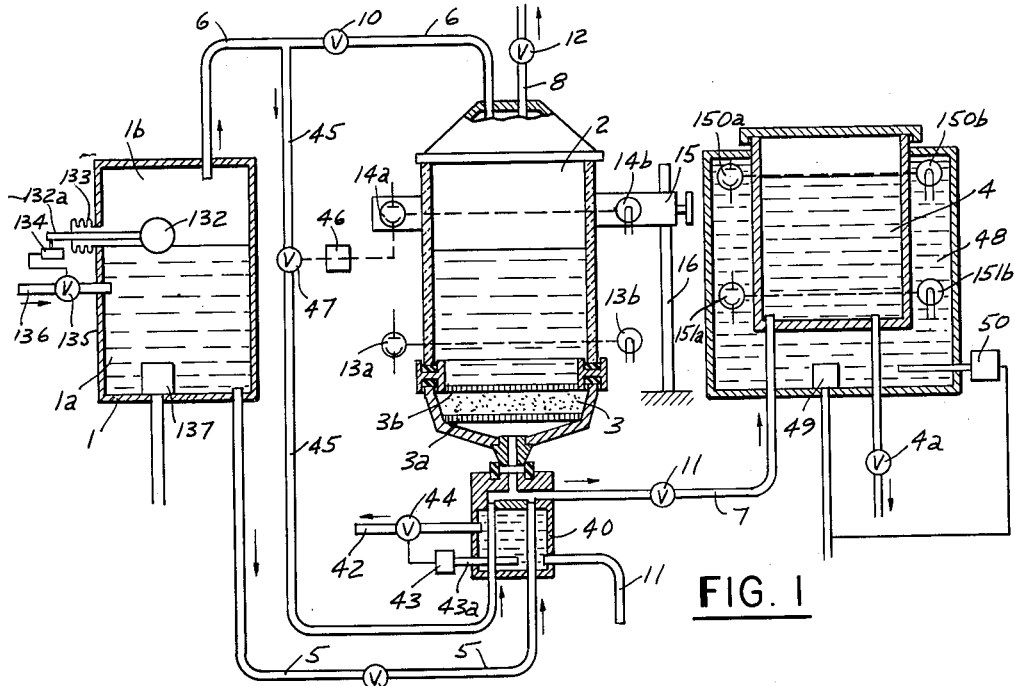
FIG. 1
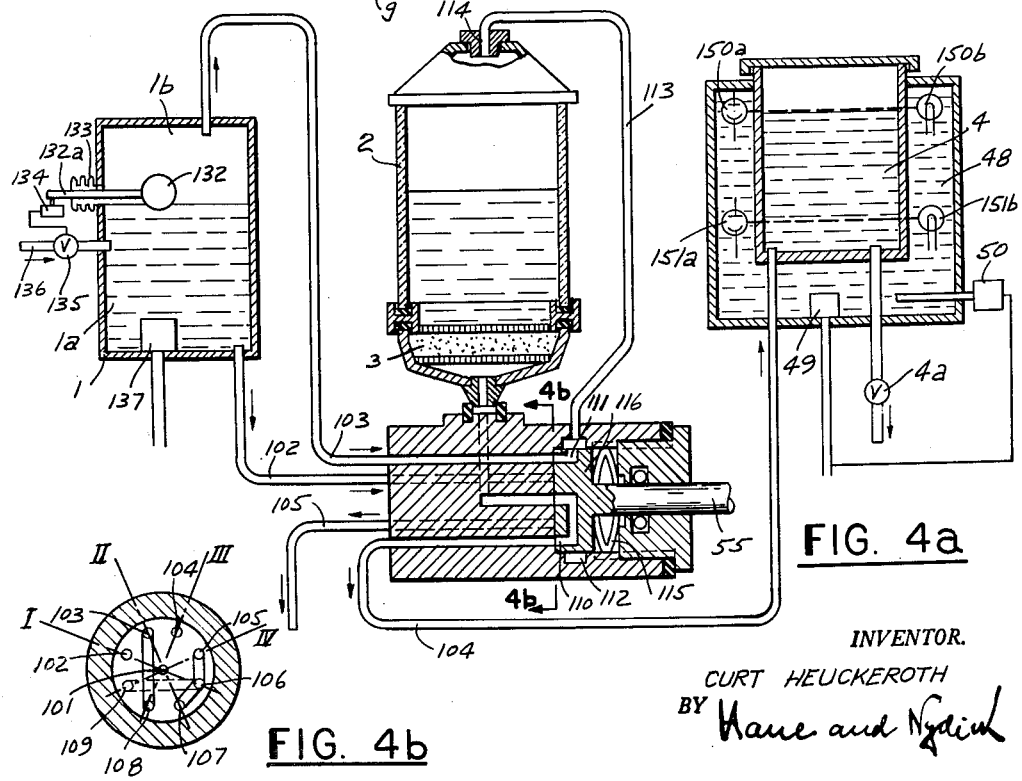
FIG. 4a
FIG. 4b
INVENTOR.
CURT HEUCKEROTH
BY Hane and Nydick
ATTORNEYS

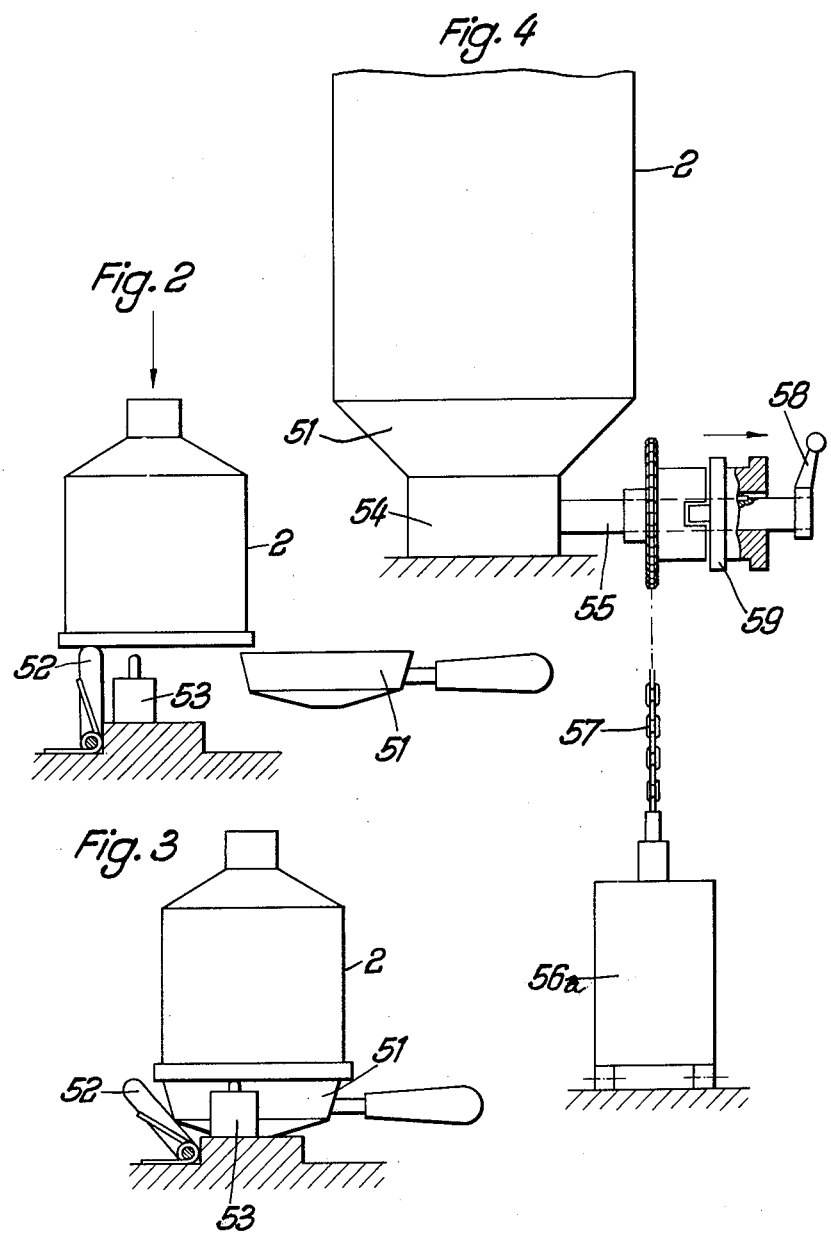

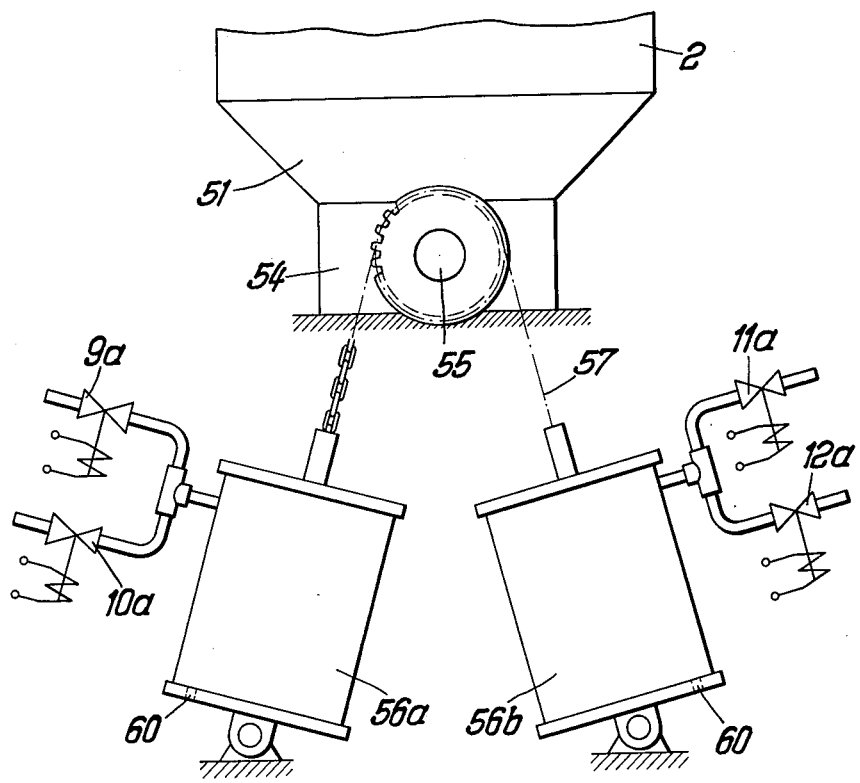

May 1, 1962 C. HEUCKEROTH 3,031,947
PERCOLATOR
Filed March 23, 1959 4 Sheets-Sheet 4

Inventor:
CURT HEUCKEROTH
By Hann and Nydick
ATTORNEYS

United States Patent Office 3,031,947
Patented May 1, 1962

3,031,947
PERCOLATOR
Curt Heuckeroth, Steinbach, near Michelstadt, Odenwald, Germany, assignor to Rowenta Metallwarenfabrik G.m.b.H., Waldstrasse, Germany
Filed Mar. 23, 1959, Ser. No. 801,334
Claims priority, application Germany Mar. 21, 1958
10 Claims. (Cl. 99—283)

This invention relates to a percolator for the preparation of coffee and similar beverages having a steaming vessel, a water container or boiler, and a reservoir for the prepared beverage. Although the invention may be applied to the preparation of beverages other than coffee, it will, for the sake of simplicity, hereinafter be referred to particularly in connection with the preparation of coffee.

In machines of this type it has been necessary, prior to this invention, to operate the control means of the percolator by hand and, at the same time, to watch the level of the liquid in the steaming vessel. This has proved very inconvenient and time-consuming and has given rise to failures and scalding. The invention, therefore, in one of its particular aspects, serves the main object of providing a percolator in which such manipulation and observation is unnecessary, and in which practically all operations in the preparation of the beverage are rendered fully automatic.

In devising a machine in accordance with the invention it has been taken into account, that for the preparation of what is commonly termed "a good coffee" the drawing or steaming temperature of the beverage has to be maintained constant within well defined limits, as for instance 85 to 92° C., and that it is advisable not to lead the coffee from the steaming vessel immediately into the reservoir, but to first subject it in the filter chamber to the action of the steam and to let it draw or simmer some time in order to make it stronger and more tasteful. Care is to be taken also, that the thus prepared coffee does not inadmissibly cool down in the reservoir.

These and other objects of the invention are attained, for example, by the arrangement of distance-controlled valves in the conduits between the boiler, the steaming vessel and the reservoir, and in that the said valves are preferably controlled in dependence of the liquid level in the steaming vessel.

The invention, for the aforesaid purpose, provides two super-posed control elements in connection with the steaming vessel, which may be photo-electrical means, and of which the upper element determines the quantity of the coffee to be made, while the lower element serves to stop the machine at a predetermined moment.

In accordance with a further feature of the invention, the reservoir may also be provided with a control means which sets the machine going when the level of the liquid in the reservoir has fallen below a predetermined level.

Still another, though optional, feature of the invention consists in combining the valves in the conduits between the boiler, the steaming vessel and the reservoir so as to form one interconnected unit, which may have the form of a multiway cock, and to cause this unit to be distance-controlled in dependence of the liquid level in the steaming vessel or in the reservoir.

It is advisable, though not absolutely necessary, to provide a cooler of any known or convenient type in front of the steaming vessel, and a temperature control, also in connection with the steaming vessel, by means of which the most favorable temperature—say 85 to 92° C., may be obtained and kept constant for any predetermined length of time.

The aforesaid uppermost photo-electric means in the steaming vessel may be used in connection with a timer, such as an electric time relay or the like, which is controlled by interruptions in the rays of the light which is emitted by the photo-electric cell or the lamp belonging thereto respectively, thereby to determine the drawing or steaming time for the coffee as by the interposition of a solenoid valve.

It has been found of advantage, according to a further feature of the invention, wholly or partly to submerge the reservoir for the finally prepared beverage in a hot water bath and to regulate the temperature of the same by means of a thermostat.

Further means may be provided to facilitate the operation of the percolator or to prevent faulty operation as by the arrangement, for example, of a pawl and a control switch which would prevent the automatic means being switched on before the steaming vessel is closed. The automatic means are preferably provided with a clutch by means of which they may be uncoupled whenever required.

As for some reasons it may become necessary to operate the machine temporarily by hand, a hand lever or the like may be provided for the purpose. It is also advisable, for instance, to return the automatic means, or part of them, during the operation of the machine into their initial positions.

The accompanying purely diagrammatic drawings illustrate an embodiment of the percolator according to the invention by way of example. In these drawings, FIG. 1 represents a diagrammatic view of the mechanical assembly of the machine showing the various parts thereof in their mutual arrangement, FIG. 2 shows a safety appliance which prevents the automatic means being started when the steaming vessel is open, FIG. 3 is a view similar to FIG. 2 with the steaming vessel closed, FIG. 4 is a side view of one form of the automatic means in accordance with the invention, FIG. 4a is a detailed view partly in section, of the arrangement of FIG. 4, and FIG. 4b is a section taken on line 4b—4b of FIG. 4a.

FIG. 5 is a front view of FIG. 4.

Figure 6:
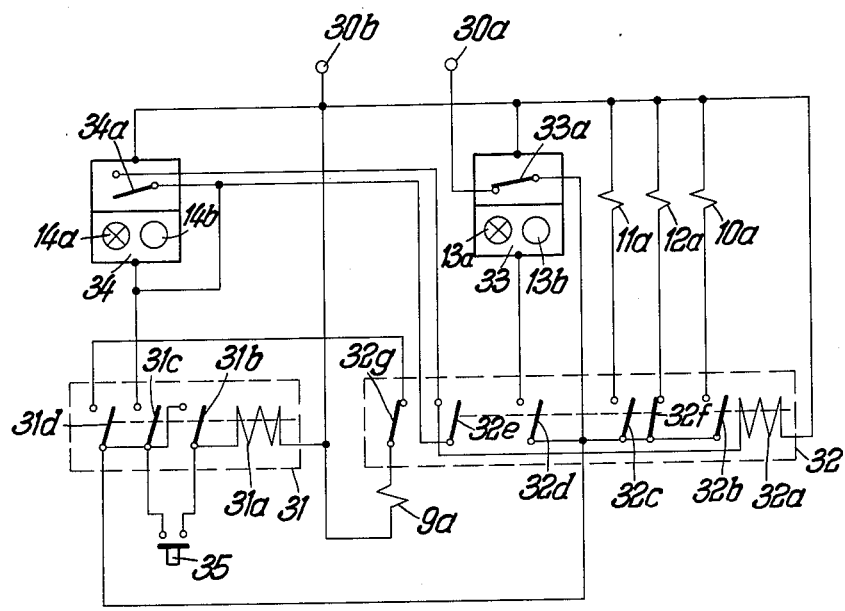
FIG. 6 shows a wiring diagram.

In the embodiment of the invention as it is represented in these drawings, the percolator substantially consists of the boiler 1, the steaming vessel 2 with its filter chamber 3, and the container 4 in which the finally prepared coffee may be stored before being poured out. The feed of water into boiler 1 may be controlled by a conventional float valve 132 which is sealed to the wall of the boiler by means of a bellows 133. A valve rod 132a controls a switch contact 134 which in turn controls a valve 135 in a feed pipe 136 for fresh water. Valve 135 closes the water feed in response to a water level in boiler 1 above a predetermined level. These three units of the percolator are interconnected by conduits which may be opened or closed by valves, preferably solenoid valves.

The boiler 1 serves for the heating of the water in the water chamber 1a, the rising steam collecting in the steam chamber or dome 1b of the boiler. The previously ground coffee is placed in the filter chamber 3 which is formed in the steaming vessel 2 by the sieves 3a and 3b, which also serve the purpose of preventing the coffee powder from floating about in the vessel.

A water conduit 5, leading from the boiler 1, to the steam vessel 2 below the filter chamber 3, while the steam chamber 1b of the boiler 1 is connected to the upper part of the steaming vessel 2 by means of the steam pipe 6. Connected to this steam pipe is a steam conduit 45 which leads into the steaming vessel from below.

The lower part of the steaming vessel 2 communicates with the coffee container 4 by means of a conduit 7. A drain cock 4a is provided to discharge the coffee from the container, while a ventilating pipe socket 8 is fitted to the top of the steaming vessel 2.

A number of valves, preferably of the solenoid type, are provided, of which the valve 9 is in the conduit 5, the valve 10 in the steam pipe 6, the valve 11 in the communication pipe 7, and the valve 12 in a vent pipe 8 of vessel 2. Valves 9, 10, 11 and 12 are controlled by the state of energization of solenoid coils 9a, 10a, 11a and 12a as will be more fully explained in connection with FIG. 6.

The steaming vessel 2 is of preferably cylindrical shape and made of glass or other transparent material. A short distance above the filter chamber 3 is provided a photo-electric screen which consists of a lamp 13a and a photo cell 13b. The rays emanating from the lamp pass through the vessel 2, but can be interrupted by the coffee contained therein.

A second photo-electric screen is arranged on an arm 15 some way above the first screen and consists of the lamp 14a and the photo cell 14b. The arm 15 is adjustable in height by being mounted on a stand or column 16.

The water conduit 5, preferably at or below the place where it enters the steaming vessel 2, is surrounded by a cooler 40 having an inlet 41 and an outlet 42. A thermostat 43 having a probe 43a extending into cooler 40 is provided which regulates the flow of the water from the outlet valve by means of a solenoid valve 44. If preferred, the regulating means may be arranged on the inlet pipe 41 instead of on the outlet 42. The thermostat is preferably adjustable in order to enable the operator to regulate the degree of cooling as desired.

Provided in the steam conduit 45 is a solenoid valve 47 which can be controlled by a timer 46 which latter is in connection with the upper photo-electric screen 14a, 14b and is regulated by interruptions of the rays of the light. The timer, which may be an electric time relay, is preferably adjustable and may be set so as to regulate the time which the coffee is allowed to draw, that is the time during which the steam is passed through the filter chamber 3 into the vessel 2.

The reservoir is submerged in a water bath 48 for which a heater 49 is provided, a thermostat 50 serving to regulate the temperature of the water by acting on the heater accordingly. The arrangement may be such that only a part of the reservoir is submerged in hot water.

The preparation of the coffee in the aforedescribed percolator proceeds as follows: After the coffee powder has been placed into the filter chamber 3 between the sieves 3a and 3b, a switch button or the like is depressed. This causes de-energization of solenoid coils 9a and 12a whereby valves 9 and 12 open and energization of solenoid coils 10a and 11a whereby the valves 10 and 11 close, or remain closed respectively. The photo-electric screen 14a, 14b is also energized, while the photo-electric screen 13a, 13b remains without current for the time being. The steam pressure which exists in the boiler 1 presses the hot water through the water conduit 5 into the filter chamber 3 and through the same into the vessel 2, from which the air is allowed to escape through the socket 8 and the valve 12. The coffee now begins to rise in the vessel 2 until the photo-electric screen 14, 14a becomes interrupted, whereupon the respective photo-electric screen switches the timer 46 into the circuit, which controls the solenoid valve 47 in the steam conduit 45.

The opening of the solenoid valve 47 causes the steam from the steam chamber 1b of the boiler 1 to be forced through the filter chamber 3 into the vessel 2 for the duration of time to which the timer 46 has previously been set. At the end of this period, the action is reversed by corresponding relays, whereby the valves 9, 12 and 47 are closed and the valves 10 and 11 are opened, and the photo-electric screen 13a, 13b is switched into the current. Now the steam from the boiler 1 passing through the pipe 6 forces the coffee in reverse direction out of the steaming vessel 2 again through the filter chamber 3 and the communication pipe 7 into the reservoir 4, from which it can be poured out through the drain cock 4a.

If the coffee level in the steaming vessel 2 falls below the level 13a, 13b, the photo cell 13b causes the solenoid valves 9, 10 and 11 to close, while the valve 12 opens. Further, both photo-electric screens 13b and 14b are switched off and the machine is now in the condition for beginning a new cycle.

As is shown in FIGS. 2, 3 and 3a, the filter chamber 3 may consist of a hand-manipulated container or pan 51, which is connectible to the bottom of the steaming vessel 2 by means of a bayonet joint (not shown). Now if it were possible to start the automatic cycle without the pan 51 being attached to the vessel 2, the water from which the coffee is to be prepared might escape from the steaming vessel via the conduit 5 and thereby upset the whole function of the machine. The invention, therefore, provides a spring-controlled pivotal pin 52 as a stop which can be pivoted out of the way by insertion of the pan 51.

In order to effect the connection between the filter chamber 3 in vessel 2 and the pan 51 and between the water conduit 5 and the steam vessel 2, vessel 2 should be visualized as being vertically movable so that by a downward directed pressure as indicated by the arrow in FIG. 2, the aforementioned components are pressed together. However, such pressure will have no effect as long as the stop 52 has not been pushed out of the way by the pan 51. Only after the stop has been moved into the position of FIGS. 3 and 3a, the steaming vessel 2 can be moved downwardly and pressed firmly onto the pan 51. This downward movement also actuates a normally open control switch 53 which, in its elevated open position as shown in FIG. 2, interrupts the energizing circuits for all the valves referred to in connection with FIG. 1.

It is possible, in accordance with the invention, to combine the valves 9, 10, 11, 12 and 47 which, in FIG. 1, are all shown to be separte, in one common valve body such as indicated in FIG. 4. A particularly practical design would be such one, in which the valves are arranged in the shape of a multiway cock, which would enable the various positions of the valves to be obtained simply by turning the common shaft into the requisite positions. The multi-way cock diagrammatically shown in FIG. 4 is shown in FIGS. 4a and 4b in detail.

According to FIGS. 4a and 4b, the cock valve comprises a valve body 54, including eight bores 102 through 109 which are disposed parallel to each other in circular arrangement. The bores are connected to steam vessel 1, brewing vessel 2, storage vessel 4 and also through a pipe 113 with the vent opening 114 at the top of vessel 2. Bores 103 and 108 and also the bores 105, 106, 107 and 109 are connected by cross bores within valve body 54. A bore 101 in valve body 54 is connected by a transverse bore with the filter chamber 3 in vessel 2 and hence with vessel 2 itself when the machine is operating. Valve body 54 further includes an annular channel 112 which is connected with the aforementioned pipe 113 and thus connects the vent 114 with a bore 111.

The movable part of the cock valve is shown as a control disc 116 mounted on a shaft 55 and comprises bores 111 and 110. Bore 111 connects annular channel 112 with one of the bores 102 through 109 in accordance with the position of control disc 116. Bore 110 also connects one of the eight bores 102 through 109 with the central bore 101. Four of the eight bores 102 through 109 are connected to pipes identified by the same reference numerals. More specifically, bore 102 connects the lower part of the steam vessel 1 with valve body 54. The valve body is further connected by bore 103 and pipe 103 with the steam chamber of vessel 1, by bore 104 and pipe 104 with the storage container 4, and by bore 105 and pipe 105 with the atmosphere.

In FIG. 4b, four positions of the cock valve are indicated by numerals I through IV.

In position I, the following bores and pipes are in communication:

110 and 102—111 and 106.

Accordingly, hot water flows from the lower part of vessel 1 through pipe and bore 102 and pipe and bores 110, 101 into brewing vessel 2 from the bottom thereof. The hot water will penetrate the supply of coffee in the brewing vessel (see FIG. 1) and gradually rise in vessel 2 until the feed of water is cut off when the level of the water reahces the upper light screen 14a—14b. While the water is rising in vessel 2, air will escape from the upper part of the vessel through vent 114, pipe 113, annular bore 112, bores 111, 106, 105 and pipe 105.

When now control disc 116 is turned into position II, the following bores and pipes are connected:

110 and 103—111 and 107.

Accordingly, steam is withdrawn from the steam chamber of vessel 1 and fed through pipe and bores 103, 110 and 101 to the filter chamber 3 of brewing vessel 2. Accordingly the brewed coffee is penetrated by steam while the flavor essences are extracted from the supply of ground coffee. At the same time, the upper part of brewing vessel 2 is again aerated through vent 114, bores 112, 111, 107 and the now connected bore 105 and pipe 105 communicating with the bore.

When control disc 116 is turned into position III, bores 110 and 104 and also bores 111 and 108 are connected. Steam now flows from vessel 1 through pipe 103, bore 103 to bore 108 connected with bore 103. The steam then flows through bore 111, annular bore 112, bore 113 and pipe 113 into vessel 2 from the top thereof and presses the brewed coffee downwardly through filter chamber 3 into bore 101 from which it flows through bores 110, 104 and pipe 104 into storage container 4.

After the brewing vessel has been emptied, control disc 116 is turned into position IV, in which bores 102, 105 and bores 111, 109 are connected. The filter chamber 3 is aerated through bores and pipes 101, 110 and 105. The brewing vessel itself is aerated from the top through pipe 113, bore 113, annular bore 112, bores 111, 109, bore 105 and pipe 105.

Rotation of the shaft may be effected, for example, by hydraulic cylinders 56a and 56b which actuate the shaft 55 by means of a chain or the like 57. Control of the cylinders 56a and 56b may be effected by the solenoid valves 9a, 10a, or 11a and 12a respectively (FIG. 5). The admission pipes to the solenoid valves 9a and 11a may be connected to a hydraulic supply conduit, while the ventilation of the cylinders 56, which are driven in only one direction, takes place by the valves 10a and 12a. Cylinder 56a causes a left turn of the shaft 55, that is in counter clockwise direction, while the cylinder 56b causes it to perform a right turn, i.e. in clockwise direction. Each time the operating piston of one cylinder moves the non-operating piston of the other. Both cylinders 56a and 56b are provided with a ventilation aperture 60. The mode of operation, for example of the cylinder 56a in FIG. 5, is as follows:

Assuming inlet valve 9a to be open and valve 10a to be closed, then outlet valve 12a must be open. If now a hydraulic pressure is exerted through the valve 9a onto the cylinder 56a, the piston of the latter (not shown) moves downwardly and in doing so turns the shaft 55 to the left. If, however, shaft 55 is to be turned in the opposite direction, valve 11a must be open and valve 12a closed, while valve 10a must be open. The hydraulic pressure which is admitted to the cylinder 56b via the valve 11a causes a downward movement of the piston in this cylinder and, thereby, a turn of the shaft 55 to the right, that is in clockwise direction.

The solenoid valves are also controlled by the timer 46.

It stands to reason that the valve body 54, instead of being hydraulically controlled, may be controlled by pneumatic, electric, or by any other appropriate means. Similarly may the hydraulic drive of shaft 55 be substituted by other, equivalent means, such as pneumatic, electric, electromagnetic, or other.

The embodiment of the invention as hereinbefore described has the advantage, that the electrically operated solenoid valves have to operate only cold water for the control of the hydraulic cylinders 56a, 56b. The common valve body 54 may be designed very sturdy, since the hydraulic drive is able to exert forces of any desired magnitude. An additional advantage is that, in the event of a disturbance, the operation of the machine may be continued by hand.

For this purpose the shaft 55 is provided with a hand lever 58 by means of which all movements which normally take place automatically, may be effected by hand. But to avoid having to move also the hard-going hydraulic drive by hand, provision is made to completely uncouple the same by means of a clutch 59 as shown in FIG. 4. This figure shows diagrammatically the action of the hydraulic driving means 56 of the common valve body 54 by the hand lever 58 and the clutch 59 for uncoupling the hydraulic drive as aforesaid.

In order to be able, in case of emergency or disturbance, immediately to reverse the machine, the automatic means are provided with a push button or the like, which may be marked "danger" or "off," and by the actuation of which the machine would immediately return into its initial position.

FIG. 6 shows a simple wiring diagram of the controls including the photo-electric screens and the contacts which are used in the electric installation. Power is supplied to the installation through line terminals 30a and 30b. The entire automatic cycle is started by the push button 35, which energizes the contactor 31 and maintains it in position over the hold contact 31b also after the button 35 has been released.

The solenoid 9a of the valve 9 is energized over the contact 31d and the photo-electric control 34 brought into operating readiness via the contact 31c. If the coffee in the steaming vessel has risen so high as to interrupt the light screen 14a, 14b, contact 34a is closed so that the coil 32a of the contactor 32 becomes energized. The solenoid valves 10 and 11 open due to de-energization of coils 10a and 11a, while the solenoid valves 9 and 12 close due to energization of coils 9a and 12a. The photoelectric control 33 is placed in condition ready for operation via the contact 32d. After the light screen 13a, 13b has been interrupted, contact 33a is opened and disconnects the whole installation, whereupon the machine returns into its initial position.

The quantity of the coffee to be prepared is determined by the position of the photo-electric screen 14a, 14b, for which reason the said control means have been arranged on the arm 15 which can be moved up and down on the stand 16. Preferably this vertical displacement is established by an auxiliary drive which may be regulated up or down over a press button or other contact member.

It will be noted that in the aforedescribed percolator the coffee is assumed to be prepared by the so-called "double filter method" which means that the water is forced twice through the coffee powder in the steaming vessel.

Instead of, or in addition to, the push button 35 a further control element, such as another photo-electric screen, maybe provided in the container 4, which can be actuated in dependence of the liquid level therein. FIG. 1 shows an upper limit screen comprising a photocell 150a and a lamp 150b and a lower limit screen comprising a photocell 151a and a lamp 151b. The upper limit screen should be visualized as controlling valve 11 in feed line 7 and the lower limit screen as controlling discharge valve 4a. As is obvious, the two limit screens will maintain the supply of beverage in container 4 within predetermined limits. If desired, the machine may then be caused to operate for a prolonged period fully automatically or, by actuating the switch 35, for the preparation of always a certain quantity of coffee only.

It must be understood that the invention is not intended to be limited by the example shown and described, but that it may be varied to suit convenience or requirements without thereby departing from the spirit of the invention within the meaning and the scope of the now following claims.

What I claim is:

1. A machine for brewing beverage by infusion extraction of flavor and other essences from a comminuted starting material, said machine comprising a closed at least partly transparent brewing container for receiving the starting material, a closed supply container for water and steam, a storage container for storing brewed beverage, first conduit means for feeding water from the supply container to the brewing container, second conduit means for feeding steam from the supply container to the brewing container, third conduit means for feeding beverage from the brewing container to the storage container, a control valve included in each of said conduit means for controlling the flow of water, steam and beverage through the respective conduit means, an upper first photo-electric means for directing a control beam through a transparent portion of the brewing container, a lower second photo-electric means for directing a second control beam through a transparent portion of the brewing container, said first photo-electric means controlling a selected upper beverage level in the brewing container, and said second photo-electric means controlling a selected lower beverage level in the brewing container, and adjustable support means for said first photo-electric means to vary the selected upper beverage level, said first photo-electric means causing an open position of the valve in the second conduit means and of the valve in the third conduit means in response to a beverage level in the brewing container cutting off the beam thereof, said valve in the first conduit means being operable prior to the valves in the second and third conduit means, and said second photo-electric means causing a closed position of the valves in all the conduit means in response to a depletion of the beverage in the brewing container uncovering the beam of the second photo-electric means.

2. A machine for brewing beverage by infusion extraction of flavor and other essences from a comminuted starting material, said machine comprising a closed at least partly transparent brewing container for receiving the starting material, a closed supply container for water and steam, a storage container for storing brewed beverage, first conduit means for feeding water from the supply container to the brewing container, second conduit means for feeding steam from the supply container to the brewing container, third conduit means for feeding beverage from the brewing container to the storage container, a control valve included in each of said conduit means for controlling the flow of water, steam and beverage through the respective conduit means, an upper first photo-electric means for directing a control beam through a transparent portion of the brewing container, a lower second photo-electric means for directing a second control beam through a transparent portion of the brewing container, said first photo-electric means controlling a selected upper beverage level in the brewing container, and said second photo-electric means controlling a selected lower beverage level in the brewing container, first actuating means for opening the valves in the first and third conduit means, a timing means for opening the valve in the second conduit means for a predetermined period of time, second actuating means for closing the valves in all the conduit means, said first photo-electric means controlling said timing means and said first actuating means in response to the beam thereof being cut off by the beverage level in the brewing container, and said second photo-electric means controlling said second actuating means in response to the beam thereof being uncovered by a depletion of the beverage in the brewing container below the beam level.

3. A machine for brewing a beverage by infusion extraction of flavor and other essences from a comminuted starting material, said machine comprising a closed at least partly transparent brewing container for receiving the starting material, a closed supply container for a supply of brewing water and steam, a storage container for storing brewed beverage, a first conduit including a control valve for feeding water from the supply container to the lower part of the brewing container, a second conduit including a control valve for feeding steam from the supply container to the lower part of the brewing container, a third conduit including a control valve for feeding steam from the supply container to the upper part of the brewing container, a fourth conduit including a control valve for feeding brewed beverage from the brewing container to the storage container, a timer controlling the second conduit valve to open the same for a predetermined period of time, an upper first photo-electric means for directing a control beam through a transparent part of the brewing container, a lower second photo-electric means for directing a second control beam through a transparent part of the brewing container, a first actuating means operable for opening the first conduit valve to supply water to the brewing container, a second actuating means for opening the third conduit valve, and control means for activating said first actuating means and said first photo-electric means, said first photo-electric means when activated operating said timer to supply steam to the lower part of the brewing container, and in response to a beverage level cutting off the beam opening the third conduit valve to admit steam to the upper part of the brewing container and also causing opening of the fourth conduit valve thereby forcing a beverage flow from the brewing container into the storage container, and said second photo-electric means causing closing of all the valves in response to a depletion of the beverage in the brewing container below a level uncovering the beam of the second photo-electric means.

4. A machine according to claim 2 wherein said valves are combined in a structural unit including a multi-passage valve, the passages of said multi-passage valve forming said valves in the conduit means.

5. A machine according to claim 3 and comprising a cooling jacket surrounding said first and second conduits, and temperature responsive means for controlling the temperature in said cooling jacket.

6. A machine according to claim 5 wherein said cooling jacket is disposed adjacent to the lower part of said brewing container.

7. A machine according to claim 2 and comprising a heating jacket surrounding said storage container, and temperature responsive means for controlling the temperature in said heating jacket.

8. A machine according to claim 1 and comprising a receptacle for confining the starting material, said receptacle being attachable to the brewing container in communication with said first and second conduit means to provide for the flow of water, steam and brewed beverage through the receptacle.

9. A machine according to claim 8 wherein said brewing container is movable into and out of cooperative engagement with said receptacle, and further comprising a normally open control switch connected in circuit with both said photo-electric means and movable into the closed position by engagement of the brewing container with the receptacle, and a yieldable safety stop blocking in one position movement of the brewing container into engagement with the receptacle and in another position permitting such engaging movement, said safety stop being biased into said one position and being moved into said other position by attachment of the receptacle to the brewing container.

10. A machine according to claim 1 and further comprising actuating means for manually controlling the valves in said conduit means, and coupling means for selectively rendering operative said manual actuating means.

References Cited in the file of this patent

UNITED STATES PATENTS

| | | |
|---|---|---|
| 389,079 | Huff | Sept. 4, 1888 |
| 1,553,644 | Still | Sept. 15, 1925 |
| 2,155,971 | Houseman | Apr. 25, 1939 |
| 2,451,195 | Brown | Oct. 12, 1948 |
| 2,544,836 | Hotvedt | Mar. 13, 1951 |
| 2,666,379 | Kaminky | Jan. 19, 1954 |
| 2,827,845 | Richeson | Mar. 25, 1958 |
| 2,830,528 | Arnett | Apr. 15, 1958 |
| 2,887,036 | Voglesonger et al. | May 19, 1959 |

FOREIGN PATENTS

| | | |
|---|---|---|
| 438,184 | Great Britain | Nov. 12, 1935 |